United States Patent
Harunari et al.

(10) Patent No.: US 6,506,840 B2
(45) Date of Patent: Jan. 14, 2003

(54) PROCESS FOR PRODUCING THERMOPLASTIC RESIN COMPOSITION

(75) Inventors: Takeshi Harunari, Mie (JP); Yoshiki Uchida, Mie (JP); Toru Doi, Mie (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 09/834,601

(22) Filed: Apr. 16, 2001

(65) Prior Publication Data

US 2001/0041760 A1 Nov. 15, 2001

(30) Foreign Application Priority Data

Apr. 18, 2000 (JP) ........................ 2000-122378

(51) Int. Cl.$^7$ .................. C08L 23/00; C08L 23/04; C08L 27/12; C08L 39/04; C08F 8/00
(52) U.S. Cl. .............. 525/191; 525/192; 525/194; 525/199; 525/203; 525/209; 525/210; 525/216; 525/217; 525/221; 525/222; 525/227; 525/230; 525/231; 525/232; 525/233; 525/238; 525/239; 525/240; 525/241
(58) Field of Search ............. 525/191, 192, 525/194, 199, 203, 209, 210, 216, 217, 221, 222, 227, 230, 231, 232, 233, 238, 239, 240, 241

(56) References Cited

U.S. PATENT DOCUMENTS

| | | | | | |
|---|---|---|---|---|---|
| 5,424,380 | A | * | 6/1995 | Doi | 525/262 |
| 5,580,928 | A | * | 12/1996 | Doi et al. | 525/205 |
| 5,766,273 | A | * | 6/1998 | Dralle-Voss et al. | 44/346 |
| 6,111,018 | A | * | 8/2000 | Doi et al. | 525/203 |

* cited by examiner

Primary Examiner—Nathan M. Nutter
(74) Attorney, Agent, or Firm—Sughrue Mion, PLLC

(57) ABSTRACT

A process for producing a succinimide resin composition is provided which comprises reacting a maleic anhydride-olefin type copolymer constituted of 40–60 mol % of maleic anhydride units, 60–40 mol % of olefin units, and 0–20 mol % of a copolymerizable monomer units with one or more amine compounds for imide formation in the presence of a second polymer other than the succinimide resin. This process improves the productivity by lowering the torque in the extrusion reaction, giving a succinimide copolymer resin composition having low yellowness and high transparency with high production efficiency.

32 Claims, No Drawings

PROCESS FOR PRODUCING THERMOPLASTIC RESIN COMPOSITION

BACKGROUND OF THE INVENTION

1. Field of the Invention

The present invention relates to a process for producing a succinimide resin composition of high quality with high production efficiency. The succinimide resin compositions produced according to the process of the present invention have excellent heat resistance and high rigidity, and are useful in many applications such as optical parts, electric and electronic parts, illuminator parts, automobile parts, medical parts, food containers, sundries, and building materials.

2. Description of the Related Art

Copolymers having succinimide units, which have high heat resistance, have been investigated for many years. For example, processes for copolymerizing methyl methacrylate and an N-aromatic-substituted maleimide are disclosed in JP-B-43-9753, JP-A-61-141715, JP-A-61-171708, and JP-A-62-109811. ("JP-A" herein means an "unexamined published Japanese patent application"; "JP-B" herein means an "examined Japanese patent publication") Processes for copolymerizing a styrene type monomer and an N-aromatic-substituted maleimide are disclosed in JP-A-47-6891, JP-A-61-76512, and JP-A-61-276807.

British Patent 815,821 discloses a process for producing a succinimide copolymer in which process a copolymer constituted of maleic anhydride and an olefin is reacted with methylamine. In this process, the maleic anhydride copolymer is amidated by methylamine in benzene, the solvent is removed, and the remaining matter is heated in an oven for imide formation to obtain a yellow tough resin. This Patent discloses also a process of the imide formation reaction conducted in an extruder.

The aforementioned copolymer of methyl methacrylate or styrene with the N-aromatic-substituted maleimide has disadvantages of brittleness, poor processability, and discoloration of the resin, although the resin has higher heat resistance with increase of the content of the N-substituted maleimide.

The above British Patent 815,821 produces a polymer which becomes yellow and, when the imide-forming reaction is allowed to proceed in an extruder, requires a high extrusion torque, resulting in lower productivity, disadvantageously. To obtain a resin composition composed of the succinimide resin and a second polymer, the produced succinimide resin is kneaded with the second polymer by melt-kneading or a like complicated step, which may cause deterioration of the quality of the product.

SUMMARY OF THE INVENTION

The object of the present invention is to provide a succinimide resin composition of high quality with high production efficiency.

The inventors of the present invention, after comprehensive investigation in view of the above problems, have found that a succinimide resin composition of high quality can be produced with high production efficiency by conducting the imide-forming reaction between a maleic anhydride-olefin type copolymer and an amine in the presence of a second polymer, and completed the present invention.

The process for producing a succinimide resin composition of the present invention is characterized in that a maleic anhydride-olefin type copolymer constituted of 40–60 mol % of maleic anhydride units, 60-40 mol % of olefin units, and 0–20 mol % of another copolymerizable monomer units is reacted for imide formation with one or more amine compounds in the presence of a second polymer other than the succinimide resin to produce a succinimide resin containing the units represented by General Formulas (1) and (2) as essential components:

General Formula (1)

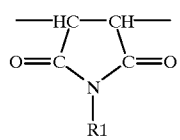

General Formula (2)

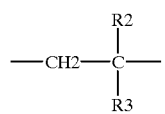

where R1, R2, and R3 denote independently hydrogen, an alkyl group of 1–6 carbons, or a cycloalkyl group.

DETAILED DESCRIPTION OF THE PREFERRED EMBODIMENT

The present invention is described below in detail.

The present invention relates to a process for producing a succinimide resin composition comprising reacting a maleic anhydride-olefin type copolymer having the units represented by the above General Formulas (1) and (2) as essential components with one or more amines for imide formation.

The maleic anhydride-olefin type copolymer employed in the present invention is constituted of 40–60 mol % of maleic anhydride units, 60-40 mol % of olefin units, and 0–20 mol % of another copolymerizable monomer units. The maleic anhydride-olefin type copolymer can be obtained by radical copolymerization of maleic anhydride, an olefin, and another monomer copolymerizable therewith.

The olefin for introducing the olefin unit includes those which give the unit represented by General Formula (2), in which R2, and R3 denote independently hydrogen, an alkyl group of 1–6 carbons, or a cycloalkyl group. The olefin includes specifically ethylene, propylene, 1-butene, 1-hexene, isobutene, 2-methyl-1-butene, 2-methyl-1-pentene, 2-methyl-1-hexene, 2-methyl-1-heptene, 2,2,4-trimethyl-1-pentene, 2-methyl-1-octene, 2-ethyl-1-pentene, 2-methyl-2-butene, and 2-methyl-2-hexene. Of these olefins, isobutene is particularly preferred since it gives a succinimide resin composition having high heat resistance and excellent mechanical properties. The olefin may be used singly or in combination of two or more thereof. The succinimide resin may contain two or more different types of units represented by General Formula (2) having different R2, or R3.

The maleic anhydride-olefin type copolymer employed in the present invention may be a copolymer which contains units of another copolymerizable monomer, provided that it does not impair the object of the present invention. The additional copolymerizable monomer includes styrene, styrene derivatives such as α-methylstyrene, and methylstyrene; dienes such as 1,3-butadiene, and isoprene; methacrylate esters such as methyl methacrylate, ethyl methacrylate, and glycidyl methacrylate; acrylate esters such as methyl acrylate, ethyl acrylate, butyl acrylate, and 2-hydroxyethyl acrylate; vinyl ethers such as methyl vinyl ether, and ethyl vinyl ether; internal olefins such as 2-butene, and norbornene; vinylpyridine; and vinyl acetate. These monomers may be used singly or in combination of two or more thereof. The unit of the copolymerizable monomer is contained preferably at a content of 0–20 mol %, more preferably not more than 5 mol %, still more preferably not more than 1 mol %.

The content of the residual maleic anhydride monomer in the maleic anhydride-olefin type copolymer employed in the present invention is preferably lower: not higher than 1% by weight, more preferably not higher than 0.1% by weight for particularly reducing the yellowness of the produced succinimide resin composition.

The maleic anhydride-olefin type copolymer employed in the present invention has preferably a number-average molecular weight ranging from $1 \times 10^3$ to $1 \times 10^6$, more preferably from $1 \times 10^4$ to $5 \times 10^5$ according to measurement by gel permeation chromatography (GPC) at 35° C in N,N-dimethylformamide solvent to obtain a succinimide resin composition excellent in moldability and mechanical properties.

The maleic anhydride-olefin type copolymer may be produced by any method without limitation, a commercial one being useful. Preferably the maleic anhydride-olefin type copolymer is produced by radical precipitation polymerization to produce the anhydride-olefin type copolymer in a particle shape, containing a reduced amount of the residual maleic acid which causes discoloration, and to obtain a succinimide resin composition of high quality with high production efficiency.

The solvent for the radical precipitation polymerization includes known precipitation polymerization solvents: acetate esters such as ethyl acetate, propeyl acetate, and butyl acetate; aromatic solvents such as benzene, toluene, and xylene; and mixed solvents such as an acetate ester or an aromatic solvent with an alcohol. A dispersion stabilizer of a cellulose type, a vinyl alcohol type, or the like may be used for the radical precipitation polymerization.

The polymerization initiator for the radical precipitation polymerization includes organic peroxides such as benzoyl peroxide, lauroyl peroxide octanoyl peroxide, acetyl peroxide, di-t-butyl peroxide, t-butyl cumyl peroxide, dicumyl peroxide, t-butyl peroxyacetate, t-butyl peroxybenzoate, and perbutyl neodecanate; and azo type initiators such as 2,2'-azobis(2,4-dimethylvaloronitrile), 2,2'-azobis(2-butyronitrile), 2,2'-azobisisobutyronitrile, dimethyl-2,2'-azobisisobutyrate, and 1,1'-azobis (cyclohexane-1-carbonitrile). The polymerization temperature may be set in accordance with the decomposition temperature of the initiator, generally ranging from 40° C. to 120° C. preferably.

The succinimide resin for the succinimide resin composition is produced through reaction of a maleic anhydride-olefin type copolymer with an amine to form a copolymer having succinimide units. The reaction proceeds in two steps: addition of the amine to the maleic anhydride-olefin type copolymer for amidation, and subsequent imide-forming ring-closing reaction. The amine employed here is an amine compound capable of introducing hydrogen, an alkyl group of 1–6 carbons, or a cycloalkyl group as the group R1 of the above General Formula (1). The amine compound includes primary amines such as methylamine, ethylamine, n-propylamine, isopropylamine, n-butylamine, s-butylamine, t-butylamine, and cyclohexylamine; ammonia; and dimethylurea, diethylurea, and the like compounds which release an amine readily by heating or a like treatment. The amine compound may be employed singly or in combination of two or more thereof. The obtained succinimide resin may contain two or more kinds of units of General Formula (1) having different R1 groups. Of the amine compounds, in the present invention, preferred are methylamine, ethylamine, isopropylamine, and cyclohexylamine for remarkable improvement of the heat resistance of the resulting succinimide resin composition. Of these, methylamine is preferred for improvement of the mechanical properties.

The amine is used, in the present invention, in an amount ranging from 80 to 1000 mol %, preferably from 90 to 200 mol %, more preferably from 100 to 150 mol % based on the maleic anhydride units in the maleic anhydride-olefin type copolymer.

The succinimide resin composition of the present invention, which contains a succinimide resin produced in the presence of a second polymer, may be prepared by various methods. In one method, a maleic anhydride-olefin type copolymer is amidized with an amine in the presence of a second polymer and subsequently the resulting amidized product is converted to an imide form. In another method, a maleic anhydride-olefin type copolymer is amidized and subsequently the resulting amidized product is converted in the presence of a second polymer to an imide form. The amidation product of the maleic anhydride-olefin type copolymer is preferably in a particle shape. Particularly preferably, the amidated maleic anhydride-olefin type copolymer is prepared by reaction of the aforementioned maleic anhydride-olefin type copolymer particles obtained by precipitation polymerization with an amine in a slurry state.

The present invention is characterized in that the amidated maleic anhydride-olefin type copolymer is converted to an imide form by imide-forming ring-closing reaction at least in the presence of a second polymer.

The second polymer employed in the present invention includes various thermoplastic resins and thermoplastic elastomers. The thermoplastic resins include polyamide resins such as nylon 6, nylon 6/6, nylon 12, nylon 4/6, and amorphous nylon; polyester resins such as polyethylene terephthalate, polypropylene terephthalate, polybutylene terephthalate, polynaphthalene terephthalate, and liquid crystal polyesters; polycarbonate; polyacetal; polyphenylene ether; alloyed resins of polyphenylene ether with polystyrene; polyphenylene sulfide; polyolefins such as high-density polyethylene, low-density polyethylene, linear low-density polyethylene, ethylene-vinyl acetate copolymers, ethylene-acrylate copolymers, polypropylene, poly-4-methyl-1-pentene, ethylene-cyclic olefin copolymers, and hydrogenated norbornene resins; acrylic resins; styrene resins such as polystyrene, styrene-acrylonitrile copolymers, styrene-methacrylate ester copolymers, ABS resins, AES resins, AAS resins, and ACS resins; vinyl chloride resins; vinylidene chloride resins; fluoroplastics; and silicone resins. The thermoplastic elastomers include polyester type elastomers, polyamide type elastomers, polyurethane type elastomers, polyolefin type elastomers, polystyrene type elastomers, and polyvinyl chloride type elastomers. The polymer may be used singly or in combination of two or more thereof. Of the second polymers, preferred are styrene-acrylonitrile copolymers, vinyl chloride resins, and the like which are compatible with the succinimide resin for the transparency of the resulting succinimide resin composition. In particular, styrene-acrylonitrile copolymers are preferred for heat resistance, optical properties, and processability of the resulting succinimide resin composition.

The second polymer is used in a ratio to the amidated maleic anhydride-olefin type copolymer which is an adduct of maleic anhydride-olefin type copolymer with an amine ranging from 0.1/99.9 to 99/1, preferably from 1/99 to 95/5, more preferably from 5/95 to 50/50 by weight for production of succinimide resin composition having high heat resistance, excellent optical properties, and high processability with high production efficiency.

In practicing the present invention, no limitation is applied, provided that the process of the present invention is not hindered. The present invention is preferably conducted by means of an extruder for achieving high production efficiency. The extruder includes known extruders such as single-screw extruders, co-rotating double-screw extruders, and counter-rotating double-screw extruders. Of the extruders, particularly preferred are co-rotating double-screw extruders for uniform reaction and high self-cleanability. The extruder has preferably at least one vent since volatile matters like water are released in the imide-forming reaction. In practicing the present invention, the reaction temperature ranges preferably from 150° C. to 400° C., more preferably from 200° C. to 300° C. for high reaction efficiency for succinimide resin composition, for smooth proceeding of the imide-forming reaction, and further for avoiding possible thermal deterioration of the resulting resin composition which causes discoloration and decomposition. The reaction temperature may be elevated or lowered continuously or stepwise. As the reaction catalyst, a basic catalyst or an acidic catalyst such as triethylamine, and toluenesulfonic acid, may be used. The screws of the double-screw extruder may be of a known type such as a full-flighted screw type, a kneading screw type, a seal ring screw type, and a pumping screw type. The residence time in the extruder is not specially limited, ranging preferably from 1 to 1000 seconds. The construction material for the cylinder and screw of the extruder may be any known material which has corrosion resistance and abrasion resistance.

The reaction degree of the imide formation depends on the reaction temperature, the reaction time, and other conditions. From the point of the thermal stability and processability of the resulting copolymer, the conversion degree of the maleic anhydride units in the copolymer to the succinimide units is preferably not lower than 80 mol %, more preferably not lower than 95 mol %, still more preferably not lower than 99 mol % for achieving sufficient heat resistance. The content of the remaining amide-acid units is preferably not higher than 5 mol %, more preferably not higher than 1 mol %, still more preferably not higher than 0.1 mol %, from the point of the thermal stability of the resulting succinimide resin and for avoiding molding defects such as silver streaking and bubbling.

To the succinimide resin composition produced by the process of the present invention, there may be added a known additive, including thermal stabilizers such as phosphorus type stabilizers, phenol type stabilizers, sulfur type stabilizers, lactone type stabilizers, and amine type stabilizers; UV absorbers such as banzotriazole, banzophenone, triazine, and benzoate; hindered amine type light stabilizers; metal inactivators; dyes; organic pigments; inorganic pigments; light diffusing agents; fluorescent whiteners; antistatic agents; antiseptic agents; antibacterial agents; flame retardants; reducing agents; foaming agents; inorganic fillers in a shape of fibers particles, plates or microballoons, such as glass fillers, calcium carbonate, carbon black, titanium oxide; organic fillers; and core-shell rubbers. The above additive may be employed singly or in combination of two or more thereof. The additive may be added after polymerization, amidation, or filtration-drying prior to the imide-forming reaction, or may be added after the imide-forming reaction.

In the production process of the present invention, the productivity is further improved by conducting the imide-forming reaction in the presence of a lubricant. The lubricant includes aliphatic hydrocarbon type lubricants such as liquid paraffine, natural paraffine, and polyethylene wax; higher aliphatic alcohol type and higher fatty acid type lubricants such as cetyl alcohol, stearyl alcohol, and stearic acid; aliphatic amide type lubricants such as stearamide, oleamide, palmitamide, and methylenebisstearamide; metal soap type lubricants such as calcium stearate, zinc stearate, magnesium stearate, and barium stearate; fatty acid ester type lubricants such as butyl stearate, and ethylene glycol stearate; and composite lubricants. In particular, the lubricants having a melting point of not lower than 70° C., preferably not lower than 100° C. are preferred in view of the productivity and product quality. From the viewpoint of the quality, preferred are metal soap type lubricants. The lubricant is used usually in an amount ranging from 1 to 10000 ppm, preferably from 5 to 2000 ppm, more preferably from 10 to 500 ppm. The lubricant may be blended to the mixture of the materials, or may be preblended with the second polymer, the stabilizer, or the like.

The thermoplastic resin composition produced according to the present invention can be molded by a known molding method such as injection molding, blow molding, gas-assisted molding, extrusion molding, multi-layer extrusion molding, rotational molding, solvent-casting molding, hot-press molding, and vacuum molding. The produced molded articles, films, sheets, and tubes can be surface-treated for printing, painting, hard-coating, metal vapor deposition, anti-reflection coating, and so forth. The obtained molded articles, films, sheets, and tubes can be bonded by use of a solvent such as methylene chloride, and dioxane, or by ultrasonic bonding.

The resin compositions obtained according to the production process of the present invention have high rigidity and high heat resistance. They are useful for optical lenses such as pick-up lenses, facsimile lenses, and camera lenses: substrates of optical disks such as CD discs, and MO disks; optical films such as phase-contrast films, transparent electrode films, OHP films, light diffusion films, reflection films, forward diffusion films, polarized light separation films, and prism sheets; optical sheets such as light guide plates, and displaying sheets; electric or electronic parts such as housings for cameras, copying machines, computers, and portable telephones, connector covers, fuse covers, relay cases, switches, coil bobbins, irons parts, dryer covers, shaver covers, water heater covers, coffee-maker parts, VTR parts, air conditioner parts, and refrigerator parts; illuminator parts for illuminator covers, and sign boards; automobile parts such as headlamp lenses, tail-lamp lenses, stop-light lenses, bumpers, radiator grills, emblems, fenders, fender mirrors, door panels, door mirrors, tail-lamp rims, wheel caps, outside trim molding, instrument panels, console boxes, glove compartments, inside trims, pillar garnishes, meter hoods, car air-conditioner grille ducts, and automobile outside panels; building parts such as roof tiles, window plates, highway fences, arcade domes, light-introducing plates, sashes, and bathtubs; tablewares; bottles such as drinking water bottles, soy sauce bottles, and oil bottles; food containers and food packing materials such as food container for electronic oven heating; medical parts such as medical bags, catheters, injection syringe, artificial bones, contact lenses, artificial crystalline lenses, and medicine bottles; and clothing accessories such as buttons, fasteners; sundries such as cosmetic containers, and shampoo containers.

EXAMPLES

The present invention is described below specifically by reference to examples without limiting the invention.

The formation of the polymers in the examples was confirmed by elemental analysis, IR measurement, and NMR measurement. The number-average molecular weight of the obtained polymer was measured by gel permeation chromatography (GPC: apparatus manufactured by Tosoh Inc.) in N,N-dimethylformamide (DMF) at 37° C. (in terms of polystyrene). The yellowness was measured with a pressed sample piece of 1 mm thick (pressed at 230° C. for 3 minutes) by means of a color computer (manufactured by Suga Tester K.K.) (according to reflection measurement: tristimulus values of the reflection plate: X 79.57; Y 81.79; and Z 94.47).

The stabilizers and the second polymers employed in the examples are shown below.

Stabilizer

Phenol type stabilizer: Irganox1010 (Ciba Specialty Chemicals Co.)

Phosphorus type stabilizer: Mark PEP36 (Asahi Denka Kogyo K.K.)

Sulfur type stabilizer: AO23 (Asahi Denka Kogyo K.K.)

Second Polymer

AS resin: Cevian (Daicel Chemical Industries. Ltd.)

ABS resin: Toyolac (Toray Industries, Inc.)

Nylon 6/6 resin: Ube Nylon (Ube Industries, Ltd.)

Polyethylene: Nipolon (Tosoh Corp.)

Production Example 1

Production of Maleic Anhydride-isobutene Type Copolymer

A 2.8-kg portion of maleic anhydride, 10 g of lauryl mercaptane, 6.3 g of t-butyl peroxypivalate, and 19 L of isopropyl acetate were charged into a 30-L autoclave equipped with a Max Blend type stirrer, a nitrogen-introducing pipe, an olefin-introducing pipe, a thermometer, and a gas-releasing pipe. The inside of the autoclave was purged with nitrogen several times. Then 5.2 L of liquified isobutene was charged therein. The reaction was allowed to proceed at 70° C. for 6 hours. The formed particulate matter was collected by centrifuge, and was dried to obtain 4.4 kg of maleic anhydride-isobutene copolymer. The copolymer was found to contain maleic anhydride at a content of 50 mol % by elemental analysis, and to have a weight-average molecular weight of 200,000.

Example 1

A 2-kg portion of the particulate copolymer produced in Production Example 1, and 20 L of isopropyl acetate were charged into a 20-L autoclave. Thereto 750 mL of liquified methylamine was introduced. The content in the autoclave was stirred at 80° C. for three hours to cause reaction. After the reaction, the formed particulate polymer was collected by centrifugation and was dried to obtain 2.5 kg of an amidated maleic anhydride-isobutene copolymer.

The resulting copolymer was confirmed to have the acid anhydride unit amidated with the amine by ring-opening amidation according to disappearance of acid anhydride absorption at 1850 cm$^{-1}$ and emergence of absorption peaks of the amide unit and carboxylic acid unit in IR absorption measurement.

A 90-wt part portion of the obtained particulate amidated maleic anhydride-isobutene copolymer, 10 wt parts of the styrene-acrylonitrile copolymer, 0.1 wt part of the phenol type stabilizer, 0.2 wt part of the phosphorus type stabilizer were kneaded. The kneaded matter was extruded through a 30-mm double-screw extruder (Model: TEX30, L/D=42, manufactured by The Japanese Steel Works, Ltd.) equipped with a vacuum vent at the cylinder temperature of 250° C. at a screw rotation rate of 100 rpm for the reaction extrusion (imide-forming reaction) with increase of the feed rate to produce a succinimide resin composition.

With the increase of the feed rate, extrusion torque became larger to reach the maximum torque limit, or a feed neck phenomenon arose to prevent the production of the succinimide composition. The maximum production rate was 10 kg/h as the extrusion rate.

The imide formation degree from the amide-acid was found to be 100% according to the characteristic IR absorption at 1700 cm$^{-1}$ and 1780 cm.$^{-1}$, and $^{13}$C—NMR, without residual anhydride units. The resulting composition had a single glass transition temperature at 147° C., and had high transparency. Table 1 shows the evaluation results of the obtained succinimide resin composition.

Example 2

A succinimide resin composition was produced in the same manner as in Example 1, except that the cylinder temperature 250° C. of the double-screw extruder in Example 1 was changed to 290° C.

The maximum throughput was 10 kg/h as the extrusion rate. The resulting composition had a single glass transition temperature at 147° C., and had high transparency. Table 1 shows the evaluation results of the obtained succinimide resin composition.

Example 3

A succinimide resin composition was produced in the same manner as in Example 1 except that the materials in Example 1 of 90 wt parts of the particulate amidated maleic anhydride-isobutene copolymer produced in Production Example 1, 10 wt parts of the styrene-acrylonitrile copolymer, 0.1 wt part of the phenol type stabilizer, and 0.2 wt part of the phosphorus type stabilizer were changed to 80 wt parts of the obtained particulate amidated maleic anhydride-isobutene copolymer, 20 wt parts of the styrene-acrylonitrile copolymer, 0.1 wt part of the phenol type stabilizer, and 0.2 wt part of the sulfur type stabilizer, and the cylinder temperature of 250° C. and the screw rotation rate of 100 rpm of the double-screw extruder in Example 1 were changed to the cylinder temperature of 270° C. and screw rotation rate of 150 rpm.

The maximum throughput was 15 kg/h as the extrusion rate. The resulting composition had high transparency. Table 1 shows the evaluation results of the obtained succinimide resin composition.

Example 4

A 2-kg portion of the particulate copolymer produced in Production Example 1, and 20 L of isopropyl acetate were charged into a 30-L autoclave. Thereto 600 mL of liquified methylamine was introduced. The content in the autoclave was stirred at 70° C. for an hour to cause reaction. After the reaction, the formed particulate polymer was collected by centrifugation and was dried to obtain 2.4 kg of an amidated maleic anhydride-isobutene copolymer.

The resulting copolymer was confirmed to have the acid anhydride unit amidated with the amine by ring-opening amidation according to disappearance of acid anhydride absorption at 1850 cm.$^{-1}$ and emergence of absorption peaks of the amide unit and carboxylic acid unit in IR absorption measurement.

A 70-wt part portion of the obtained particulate amidated maleic anhydride-isobutene copolymer, 30 wt parts of the styrene-acrylonitrile copolymer, 0.1 wt part of the phenol type stabilizer, 0.2 wt part of the phosphorus type stabilizer were kneaded. The kneaded matter was extruded through a 30-mm double-screw extruder (Model: TEX30, L/D=42, manufactured by The Japanese Steel Works, Ltd.) equipped with a vacuum vent at a cylinder temperature of 250° C. at a screw rotation rate of 70 rpm for the reaction extrusion (imide-forming reaction) with increase of the feed rate to produce a succinimide resin composition.

With the increase of the feed rate, the extrusion torque became larger to reach the maximum torque limit, or a feed neck phenomenon arose to prevent the production of the succinimide composition. The maximum production rate was 20 kg/h as the extrusion rate.

The imide formation degree from the amide-acid was found to be 100% according to the characteristic IR absorption at 1700 cm$^{-1}$ and 1780 cm$^{-1}$, and $^{13}$C—NMR, with the residual anhydride unit content of 1 mol %. The resulting composition had a single glass transition temperature a 132° C., and had high transparency. Table 1 shows the evaluation results of the obtained succinimide resin composition.

Example 5

A succinimide resin composition was produced in the same manner as in Example 1 except that the materials in Example 1 of 90 wt parts of the particulate amidated maleic anhydride-isobutene copolymer produced in Production Example 1, 10 wt parts of the styrene-acrylonitrile copolymer, 0.1 wt part of the phenol type stabilizer, and 0.2 wt part of phosphorus type stabilizer were changed to 80 wt parts of the obtained particulate amidated maleic anhydride-isobutene copolymer, 20 wt parts of the ABS resin, 0.1 wt part of the phenol type stabilizer, and 0.2 wt part of the phosphorus type stabilizer, and the cylinder temperature of 250° C. and screw rotation rate of 100 rpm of the double-screw extruder in Example 1 were changed to the cylinder temperature of 250° C. and screw rotation rate of 150 rpm.

The maximum throughput was 20 kg/h as the extrusion rate. Table 1 shows the evaluation results of the obtained succinimide resin composition. The imide formation degree of the amide-acid was found to be 100% according to the characteristic IR absorption at 1700 cm$^{-1}$ and 1780 cm$^{-1}$, and $^{13}$C—NMR, without residual anhydride units. The resulting succinimide resin composition was milky white in color.

Example 6

A succinimide resin composition was produced in the same manner as in Example 1 except that the materials in Example 1 of 90 wt parts of the particulate amidated maleic anhydride-isobutene copolymer produced in Production Example 1, 10 wt parts of the styrene-acrylonitrile copolymer, 0.1 wt part of the phenol type stabilizer, and 0.2 wt part of the phosphorus type stabilizer were changed to 70 wt parts of the obtained particulate amidated maleic anhydride-isobutene copolymer, 30 wt parts of the ABS resin, 0.1 wt part of the phenol type stabilizer, and 0.2 wt part of the phosphorus type stabilizer, and the cylinder temperature of 250° C. and screw rotation rate of 100 rpm of the double-screw extruder in Example 1 were changed to the cylinder temperature of 270° C. and the screw rotation rate of 200 rpm.

The maximum throughput was 25 kg/h as the extrusion rate. Table 1 shows the evaluation results of the obtained succinimide resin composition. The resulting succinimide resin composition was milky white in color.

Example 7

A succinimide resin composition was produced in the same manner as in Example 1 except that the materials in Example 1 of 90 wt parts of the particulate amidated maleic anhydride-isobutene copolymer produced in Production Example 1, 10 wt parts of the styrene-acrylonitrile copolymer, 0.1 wt part of the phenol type stabilizer, and 0.2 wt part of the phosphorus type stabilizer were changed to 70 wt parts of the obtained particulate amidated maleic anhydride-isobutene copolymer, 30 wt parts of the nylon 6/6 resin, 0.1 wt part of the phenol type stabilizer, and 0.2 wt part of the phosphorus type stabilizer, and the cylinder temperature of 250° C. and screw rotation rate of 100 rpm of the double-screw extruder in Example 1 were changed to the cylinder temperature of 270° C. and the screw rotation rate of 100 rpm.

The maximum throughput was 25 kg/h as the extrusion rate. Table 1 shows the evaluation results of the obtained succinimide resin composition. The resulting succinimide resin composition was milky white in color.

Example 8

A succinimide resin composition was produced in the same manner as in Example 1 except that the materials in Example 1 of 90 wt parts of the particulate amidated maleic anhydride-isobutene copolymer produced in Production Example 1, 10 wt parts of a styrene-acrylonitrile copolymer, 0.1 wt part of the phenol type stabilizer, and 0.2 wt part of the phosphorus type stabilizer were changed to 80 wt parts of the obtained particulate amidated maleic anhydride-isobutene copolymer, 20 wt parts of the polyethylene resin, 0.1 wt part of the phenol type stabilizer, and 0.2 wt part of the phosphorus type stabilizer, and the cylinder temperature of 250° C. and screw rotation rate of 100 rpm of the double-screw extruder in Example 1 were changed to the cylinder temperature of 250° C. and the screw rotation rate of 200 rpm.

The maximum throughput was 25 kg/h as the extrusion rate. Table 1 shows the evaluation results of the obtained succinimide resin composition. The resulting succinimide resin composition was milky white in color.

Comparative Example 1

A 2-kg portion of the particulate maleic anhydride copolymer produced in Production Example 1, and 20 L of isopropyl acetate were charged into a 20-L autoclave. Thereto 750 mL of liquified methylamine was introduced. The content in the autoclave was stirred at 80° C. for three hours to cause reaction. After the reaction, the formed particulate polymer was collected by centrifugation and was dried to obtain 2.5 kg of an amidated maleic anhydride-isobutene copolymer.

A 100-wt part portion of the obtained particulate amidated maleic anhydride-isobutene copolymer, 0.1 wt part of the phenol type stabilizer, 0.2 wt part of the phosphorus type stabilizer were kneaded. The kneaded matter was extruded through an extruder employed in Example 1 at a cylinder temperature of 250° C. at the screw rotation rate of 100 rpm for the reaction extrusion (imide-forming reaction) with increase of the feed rate to produce a succinimide resin composition.

The maximum throughput rate was 3 kg/h as the extrusion rate. The processing torque was high, and the productivity was low. Table 1 shows the evaluation results of the obtained succinimide resin.

The imide formation degree from the amide-acid was found to be 100% according to the characteristic IR absorption at 1700 cm$^{-1}$ and 1780 cm$^{-1}$, and $^{13}$C—NMR, without residual anhydride units. The content of the isobutene units was contained at a content of 50 mol %. Table 1 shows the results.

Comparative Example 2

A succinimide resin was produced in the same manner as in Comparative Example 1 except that the cylinder temperature 250° C. in Comparative Example 1 was changed to 290° C.

The maximum throughput rate was 4 kg/h as the extrusion rate. The processing torque was high, and the productivity was low. Table 1 shows the evaluation results.

Comparative Example 3

A succinimide resin was produced in the same manner as in Comparative Example 1 except that the cylinder temperature 250° C. and the screw rotation rate 100 rpm in Comparative Example 1 was changed to a cylinder temperature of 270° C. and a screw rotation rate of 150 rpm.

The maximum throughput rate was 4 kg/h as the extrusion rate. The processing torque was high, and the productivity was low. Table 1 shows the evaluation results.

Comparative Example 4

A 80 wt part portion of the succinimide resin prepared in Comparative Example 1 and 20 wt parts of the styrene-acrylonitrile copolymer were preliminarily kneaded. The kneaded matter was extruded through the extruder at the cylinder temperature of 270° C. and the screw rotation rate of 150 rpm to produce a succinimide resin composition. Although the extrusion torque was lower, the required two-step extrusion made the production process complicated and caused discoloration of the product by the thermal history.

Comparative Example 5

A 70 wt part portion of the succinimide resin prepared in Comparative Example 1 and 30 wt parts of nylon 6/6 were preliminarily kneaded. The kneaded matter was extruded through the extruder at a cylinder temperature of 270° C. and the screw rotation rate of 100 rpm to produce a succinimide resin composition. Although the extrusion torque was lower, the required two-step extrusion made the production process complicated and caused discoloration of the product by the thermal history.

Example 9

A succinimide resin composition was produced in the same manner as in Example 1 by use of 80 wt parts of the particulate amidated maleic anhydride-isobutene copolymer produced in Production Example 1, 20 wt parts of the styrene-acrylonitrile copolymer, 0.1 wt part of the phenol type stabilizer, 0.2 wt part of the phosphorus type stabilizer, and 300 ppm of calcium stearate (mp: 148–155° C.) with the double-screw extruder at the cylinder temperature of 270° C. and the screw rotation rate of 150 rpm.

The maximum throughput was 20 kg/h as the extrusion rate. The resulting composition had high transparency. Table 1 shows the evaluation results of the obtained succinimide resin composition.

Example 10

A succinimide resin composition was produced in the same manner as in Example 1 by use of 80 wt parts of the particulate amidated maleic anhydride-isobutene copolymer produced in Production Example 1, 20 wt parts of the styrene-acrylonitrile copolymer, 0.1 wt part of the phenol type stabilizer, 0.2 wt part of the phosphorus type stabilizer, and 500 ppm of magnesium stearate (mp: 108–115° C.) with the double-screw extruder at the cylinder temperature of 270° C. and the screw rotation rate of 150 rpm.

The maximum throughput was 20 kg/h as the extrusion rate. The resulting composition had high transparency. Table 1 shows the evaluation results of the obtained succinimide resin composition.

Example 11

A succinimide resin composition was produced in the same manner as in Example 1 by use of 80 wt parts of the particulate amidated maleic anhydride-isobutene copolymer produced in Production Example 1, 20 wt parts of the styrene-acrylonitrile copolymer, 0.1 wt part of the phenol type stabilizer, 0.2 wt part of the phosphorus type stabilizer, and 300 ppm of stearic acid (mp: 67–69° C.) with the double-screw extruder at the cylinder temperature of 270° C. and the screw rotation rate of 150 rpm.

The maximum throughput was 15 kg/h as the extrusion rate. The resulting composition had high transparency. Table 1 shows the evaluation results of the obtained succinimide resin composition.

Example 12

A succinimide resin composition was produced in the same manner as in Example 1 by use of 80 wt parts of the particulate amidated maleic anhydride-isobutene copolymer produced in Production Example 1, 20 wt parts of the styrene-acrylonitrile copolymer, 0.1 wt part of the phenol type stabilizer, 0.2 wt part of the phosphorus type stabilizer, and 300 ppm of ricinolamide (mp: 65–68° C.) with the double-screw extruder at the cylinder temperature of 270° C. and the screw rotation rate of 150 rpm.

The maximum throughput was 15 kg/h as the extrusion rate. The resulting composition had high transparency. Table 1 shows the evaluation results of the obtained succinimide resin composition.

As shown in Examples, according to the present invention, a succinimide resin composition of low yellowness and high transparency can be produced by extrusion reaction with a low torque at a high productivity. The produced succinimide resin compositions are useful in many application fields such as optical parts, automobile parts, and electric and electronic parts.

TABLE 1

| Second polymer | | Cylinder temperature (° C.) | Screw rotation (rpm) | Feed rate (kg/h) | Vacuum (torr) | Transparency | Yellowness |
|---|---|---|---|---|---|---|---|
| Polymer | wt % | | | | | | |
| Example | | | | | | | |
| 1 AS resin | 10 | 250 | 100 | 10 | 5 | Good | 5 |
| 2 AS resin | 10 | 290 | 100 | 10 | 6 | Good | 7 |
| 3 AS resin | 20 | 270 | 150 | 15 | 5 | Good | 6 |
| 4 AS resin | 30 | 250 | 70 | 20 | 5 | Good | 6 |
| 5 ABS resin | 20 | 250 | 150 | 20 | 5 | Poor | 7 |
| 6 ABS resin | 20 | 250 | 200 | 25 | 6 | Poor | 8 |
| 7 Nylon 6/6 | 30 | 270 | 100 | 20 | 6 | Poor | 9 |
| 8 Polyethylene | 20 | 250 | 120 | 20 | 5 | Poor | 8 |
| Comparative Example | | | | | | | |
| 1 — | 0 | 250 | 100 | 3 | 5 | Good | 8 |
| 2 — | 0 | 290 | 100 | 4 | 5 | Good | 9 |
| 3 — | 0 | 270 | 150 | 4 | 5 | Good | 8 |
| 4 AS resin | 20 | 270 | 150 | 15 | 5 | Good | 14 |
| 5 Nylon 6/6 | 30 | 270 | 100 | 20 | 5 | Poor | 15 |
| Example | | | | | | | |
| 9 AS resin | 20 | 270 | 150 | 20 | 5 | Good | 4 |
| 10 AS resin | 20 | 270 | 150 | 20 | 5 | Good | 4 |
| 11 AS resin | 20 | 270 | 150 | 15 | 5 | Good | 8 |
| 12 AS resin | 20 | 270 | 150 | 15 | 5 | Good | 8 |

What is claimed is:

1. A process for producing a succinimide resin composition comprising reacting a maleic anhydride-olefin copolymer constituted of 40–60 mol % of maleic anhydride units, 60–40 mol % of olefin units, and 0–20 mol % of copolymerizable monomer units with one or more amine compounds for imide formation in the presence of a second polymer other than the succinimide resin to form a succinimide resin having the units represented by General Formulas (1) and (2):

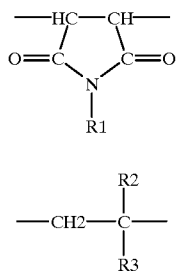

General Formula (1)

General Formula (2)

where R1, R2, and R3 denote independently hydrogen, an alkyl of 1–6 carbons, or a cycloalkyl.

2. A process for producing a succinimide resin composition comprising reacting a maleic anhydride-olefin copolymer constituted of 40–60 mol % of maleic anhydride units, 60–40 mol % of olefin units, and 0–20 mol % of copolymerizable monomer units with one or more amine compounds for imide formation in the presence of a second polymer other than the succinimide resin, said second polymer being compatible with the succinimide resin, to form a succinimide resin having the units represented by General Formulas (1) and (2):

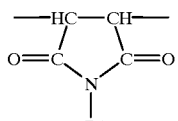

General Formula (1)

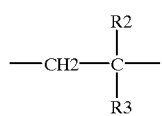

General Formula (2)

where R1, R2, and R3 denote independently hydrogen, an alkyl of 1–6 carbons, or a cycloalkyl.

3. A process for producing a succinimide resin composition comprising reacting a maleic anhydride-olefin copolymer constituted of 40–60 mol % of maleic anhydride units, 60–40 mol % of olefin units, and 0–20 mol % of copolymerizable monomer units with one or more amine compounds for imide formation in the presence of a styrene-acrylonitrile copolymer to form a succinimide resin having the units represented by General Formulas (1) and (2):

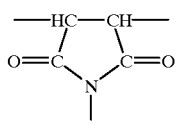

General Formula (1)

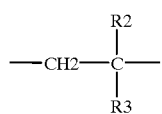

General Formula (2)

where R1, R2, and R3 denote independently hydrogen, an alkyl of 1–6 carbons, or a cycloalkyl.

4. A process for producing a succinimide resin composition comprising reacting a maleic anhydride-olefin copolymer constituted of 40–60 mol % of maleic anhydride units, 60–40 mol % of olefin units, and 0–20 mol % of copolymerizable monomer units with one or more amine compounds for imide formation in the presence of a second polymer other than the succinimide resin in an extruder to form a succinimide resin having the units represented by General Formulas (1) and (2):

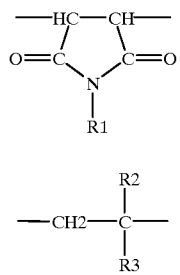

General Formula (1)

General Formula (2)

where R1, R2, and R3 denote independently hydrogen, an alkyl of 1–6 carbons, or a cycloalkyl.

5. A process for producing a succinimide resin composition comprising reacting a maleic anhydride-olefin copolymer constituted of 40–60 mol % of maleic anhydride units, 60–40 mol % of olefin units, and 0–20 mol % of copolymerizable monomer units with one or more amine compounds for imide formation in the presence of a second polymer other than the succinimide resin, said second polymer being compatible with the succinimide resin in an extruder, to form a succinimide resin having the units represented by General Formulas (1) and (2):

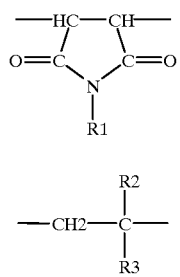

General Formula (1)

General Formula (2)

where R1, R2, and R3 denote independently hydrogen, an alkyl of 1–6 carbons, or a cycloalkyl.

6. A process for producing a succinimide resin composition comprising reacting a maleic anhydride-olefin copolymer constituted of 40–60 mol % of maleic anhydride units, 60–40 mol % of olefin units, and 0–20 mol % of copolymerizable monomer units with one or more amine compounds for imide formation in the presence of a styrene-acrylonitrile polymer in an extruder to form a succinimide resin having the units represented by General Formulas (1) and (2):

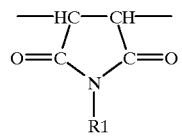

General Formula (1)

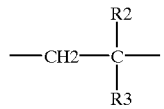

General Formula (2)

where R1, R2, and R3 denote independently hydrogen, an alkyl of 1–6 carbons, or a cycloalkyl.

7. The process for producing a succinimide resin composition according to claim 1, wherein the olefin units are isobutene units.

8. The process for producing a succinimide resin composition according to claim 1, wherein the amine compound is at least one selected from the group consisting of methylamine, ethylamine, isopropylamine, and cylohexylamine.

9. The process for producing a succinimide resin composition according to claim 1, wherein the imide formation reaction is conducted in the presence of a lubricant.

10. The process for producing a succinimide resin composition according to claim 9, wherein the lubricant has a melting point not lower than 70° C.

11. The process for producing a succinimide resin composition according to claim 2, wherein the olefin units are isobutene units.

12. The process for producing a succinimide resin composition according to claim 3, wherein the olefin units are isobutene units.

13. The process for producing a succinimide resin composition according to claim 4, wherein the olefin units are isobutene units.

14. The process for producing a succinimide resin composition according to claim 5, wherein the olefin units are isobutene units.

15. The process for producing a succinimide resin composition according to claim 6, wherein the olefin units are isobutene units.

16. The process for producing a succinimide resin composition according to claim 2, wherein the amine compound is at least one selected from the group consisting of methylamine, ethylamine, isopropylamine, and cylohexylamine.

17. The process for producing a succinimide resin composition according to claim 3, wherein the amine compound is at least one selected from the group consisting of methylamine, ethylamine, isopropylamine, and cylohexylamine.

18. The process for producing a succinimide resin composition according to claim 4, wherein the amine compound is at least one selected from the group consisting of methylamine, ethylamine, isopropylamine, and cylohexylamine.

19. The process for producing a succinimide resin composition according to claim 5, wherein the amine compound is at least one selected from the group consisting of methylamine, ethylamine, isopropylamine, and cylohexylamine.

20. The process for producing a succinimide resin composition according to claim 6, wherein the amine compound is at least one selected from the group consisting of methylamine, ethylamine, isopropylamine, and cylohexylamine.

21. The process for producing a succinimide resin composition according to claim 2, wherein the imide formation reaction is conducted in the presence of a lubricant.

22. The process for producing a succinimide resin composition according to claim 3, wherein the imide formation reaction is conducted in the presence of a lubricant.

23. The process for producing a succinimide resin composition according to claim 4, wherein the imide formation reaction is conducted in the presence of a lubricant.

24. The process for producing a succinimide resin composition according to claim 5, wherein the imide formation reaction is conducted in the presence of a lubricant.

25. The process for producing a succinimide resin composition according to claim 6, wherein the imide formation reaction is conducted in the presence of a lubricant.

26. The process for producing a succinimide resin composition according to claim 21, wherein the lubricant has a melting point not lower than 70° C.

27. The process for producing a succinimide resin composition according to claim 22, wherein the lubricant has a melting point not lower than 70° C.

28. The process for producing a succinimide resin composition according to claim 23, wherein the lubricant has a melting point not lower than 70° C.

29. The process for producing a succinimide resin composition according to claim 24, wherein the lubricant has a melting point not lower than 70° C.

30. The process for producing a succinimide resin composition according to claim 25, wherein the lubricant has a melting point not lower than 70° C.

31. A process for producing a succinimide resin composition comprising reacting a maleic anhydride-olefin copolymer constituted of 40–60 mol % of maleic anhydride units, 60–40 mol % of olefin units, and 0–20 mol % of copolymerizable monomer units with one or more amine compounds for imide formation in the presence of a second polymer other than the succinimide resin to form a succinimide resin having the units represented by General Formulas (1) and (2):

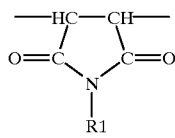

General Formula (1)

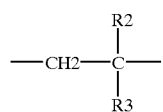

General Formula (2)

where R1, R2, and R3 denote independently hydrogen, an alkyl of 1–6 carbons, or a cycloalkyl, wherein the amide formation reaction is conducted in the presence of 5–2,000 ppm of a lubricant.

32. A process for producing a succinimide resin composition comprising reacting a maleic anhydride-olefin copolymer constituted of 40–60 mol% of maleic anhydride units, 60–40 mol % of olefin units, and 0–20 mol % of copolymerizable monomer units with one or more amine compounds for imide formation in the presence of a second polymer other than the succinimide resin to form a succinimide resin having the units represented by General Formulas (1) and (2):

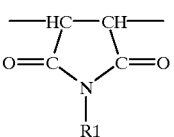

General Formula (1)

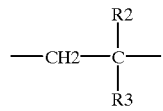

General Formula (2)

where R1, R2, and R3 denote independently hydrogen, an alkyl of 1–6 carbons, or a cycloalkyl, wherein the amide formation reaction is conducted in the presence of 5–2,000 ppm of a lubricant, wherein the lubricant has a melting point not lower than 70° C.

* * * * *